United States Patent
Yan et al.

(10) Patent No.: US 8,458,254 B2
(45) Date of Patent: Jun. 4, 2013

(54) PEER-TO-PEER NETWORK SYSTEM, PROXY SERVICE PEER, AND METHOD FOR PEER INTERWORKING BETWEEN OVERLAY NETWORKS

(75) Inventors: Zhefeng Yan, Shenzhen (CN); Jiahao Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 607 days.

(21) Appl. No.: 12/558,280

(22) Filed: Sep. 11, 2009

(65) Prior Publication Data

US 2010/0064008 A1 Mar. 11, 2010

Related U.S. Application Data

(63) Continuation of application No. PCT/CN2007/071238, filed on Dec. 14, 2007.

(30) Foreign Application Priority Data

Mar. 13, 2007 (CN) .......................... 2007 1 0086485

(51) Int. Cl.
*G06F 15/16* (2006.01)
*G06F 15/173* (2006.01)
*G06F 9/455* (2006.01)
*H04L 9/32* (2006.01)
*H04W 72/00* (2009.01)

(52) U.S. Cl.
USPC ........... 709/204; 709/206; 709/217; 709/226; 709/228; 709/229; 709/238; 709/241; 713/168; 718/105; 455/453

(58) Field of Classification Search
USPC ................. 709/204, 206, 217, 226, 228, 229, 709/238, 241; 713/168; 718/105; 455/453
See application file for complete search history.

(56) References Cited

U.S. PATENT DOCUMENTS

| 7,206,934 | B2 * | 4/2007 | Pabla et al. | .................... 713/168 |
| 7,657,597 | B2 * | 2/2010 | Arora et al. | .................... 709/206 |

(Continued)

FOREIGN PATENT DOCUMENTS

| CN | 1801822 | 7/2006 |
| CN | 1889676 | 1/2007 |

(Continued)

OTHER PUBLICATIONS

Wang, Jindong, et al., "Network Management Model Based on Tri-dimensional Overlay Network," Journal of Jilin University (Information Science Edition), Jan. 2006, vol. 24, No. 1, ISSN. 1671-5896, pp. 62-67.

Li, Weizheng, et al., "Distributed location management for mobile IP regional registration," Journal of Circuits and Systems, Jun. 2005, vol. 10, No. 3, ISSN. 1007-0249, pp. 32-38.

(Continued)

*Primary Examiner* — David Lazaro
*Assistant Examiner* — Vitali Korobov
(74) *Attorney, Agent, or Firm* — Staas & Halsey LLP

(57) ABSTRACT

The present invention relates to a P2P network system. The P2P network system includes: multiple local overlay networks, each comprising multiple proxy service peers; a global overlay network composed of the proxy service peers of all local overlay networks. The proxy service peer is adapted to respond to the request of the requesting peer, query the local overlay network or global overlay network, and return the address information of the requested peer or the requested proxy service peer to the requesting peer. The present invention also relates to a proxy service peer applicable to the foregoing network system, and a method of peer interworking between P2P overlay networks based on the foregoing system. The present invention relieves the load of the proxy service peer, avoids blindness of the requesting peer in selecting the proxy service peer, and achieves load balance between proxy service peers.

10 Claims, 4 Drawing Sheets

U.S. PATENT DOCUMENTS

| | | |
|---|---|---|
| 2003/0229697 A1 | 12/2003 | Borella |
| 2004/0044727 A1* | 3/2004 | Abdelaziz et al. ............ 709/203 |
| 2004/0064512 A1* | 4/2004 | Arora et al. .................. 709/206 |
| 2004/0064568 A1* | 4/2004 | Arora et al. .................. 709/228 |
| 2004/0064693 A1* | 4/2004 | Pabla et al. .................. 713/168 |

FOREIGN PATENT DOCUMENTS

| | | |
|---|---|---|
| CN | 101039247 A | 9/2007 |
| CN | 100531098 | 8/2009 |
| WO | 2006/092368 | 9/2006 |

OTHER PUBLICATIONS

*A Hierarchical P2P-SIP Architecture*, SIPPING Working Group, The Internet Society, Aug. 22, 2006, pp. 1-23.
*A P2P Approach to SIP Registration and Resource Location*, P2PSIP (Proposed), The Internet Society, Oct. 22, 2006, pp. 1-80.
Written Opinion of the International Searching Authority, mailed Mar. 27, 2008, in corresponding International Application No. PCT/CN2007/071238 (7 pp.).
Office Action, mailed Jun. 6, 2008, in corresponding Chinese Application No. 200710086485.0 (10 pp.).

* cited by examiner

US 8,458,254 B2

PEER-TO-PEER NETWORK SYSTEM, PROXY SERVICE PEER, AND METHOD FOR PEER INTERWORKING BETWEEN OVERLAY NETWORKS

CROSS-REFERENCE TO RELATED APPLICATIONS

This application is a continuation of International Application No. PCT/CN2007/071238, filed on Dec. 14, 2007, which claims priority to Chinese Patent Application No. 200710086485.0, filed on Mar. 13, 2007, both of which are hereby incorporated by reference in their entireties.

FIELD OF THE INVENTION

The present invention relates to a peer-to-peer network system, a proxy service peer, and a method for peer interworking between Peer-to-Peer overlay networks, pertaining to the field of network communication.

BACKGROUND

The Peer-to-Peer Session Initiation Protocol (P2PSIP) is a new series of communication protocols currently being formulated by the Internet Engineering Task Force (IETF). The P2PSIP is an extension from the Session Initiation Protocol (SIP). In essence, the Peer to Peer (P2P) feature is introduced. The client/server (C/S) architecture of traditional SIP communication system is discarded. In the C/S architecture, a central server is depended on to perform user registration, authentication, routing and searching. Through a P2P overlay network, the P2PSIP implements distributed user registration and route locating (namely, the user's information such as "contact" information is stored on overlay network peers in a distributed way). The peers that make up a P2P overlay network are all the terminal peers (such as user computers) which participate in the communication and have certain processing capabilities. This architecture reduces the deployment and maintenance costs for operators and communication costs for users, and improves extensibility and robustness of the system.

With the development and application of future networks, many independent P2P overlay networks may come forth. Such overlay networks may be constructed based on the specific service, network topology, geographic location or common interest. The P2P overlay networks independent of each other may need to interwork, for example, a basic requirement is searching for the location information of a user, namely, one user in a P2P overlay network hoping to locate a user in another overlay network and originate a call request. Besides, the peers in the overlay network may provide other resource and service capabilities for the system (service capabilities may also be regarded as a resource), for example, Network Address Translation (NAT) traversal service, media relay service, gateway and streaming media service. Each overlay network provides plenty of resources. In view of the sharing principles of the P2P network, the resources may be shared not only in the local P2P overlay network, but also in other overlay networks that use the P2P protocol, thus a resource overlay network is constituted in a sense. To sum up, interworking between overlay networks is one of the important issues to be tackled by the P2P.

In the prior art, the essence of the P2P for implementing interworking between overlay networks is: each P2P overlay network (called "local overlay") has a P2P proxy service peer. The P2P proxy service peer is a SIP proxy server responsible for routing messages between the local overlay networks. The P2P proxy service peers of all local overlay networks make up an overlay network of a higher layer (called "global overlay"). Each P2P proxy operates two P2P protocol stacks (supposing the lower-layer P2P algorithm varies between the overlay networks). One protocol stack is for the local P2P overlay network, and the other protocol stack is for the global P2P overlay network.

The local overlay network also maintains a P2P proxy candidate list. The members in the list are inactive as P2P proxy candidates. The P2P proxy candidate peers send a "HELLO" probe message periodically to the P2P proxy service peer to check whether the P2P proxy service peer is working normally. When detecting that the P2P proxy fails, a peer in the proxy candidate list is activated automatically, incorporated into the global overlay network and registered to be a P2P proxy. If the P2P proxy leaves actively, the P2P proxy needs to select a proxy candidate peer as a P2P proxy service peer.

In the prior art of peer interworking between P2P overlay networks, the local overlay network has only one P2P proxy service peer. However, the P2P network is dynamic (enormous peers may access the network anytime) and the resources are shared, which leads to a heavy load of request tasks to be processed by the proxy service peer. In the local overlay network, when the P2P proxy service peer is overloaded, other peers serve as only proxy candidates. Therefore, the prior art does not make the best of all proxy service resources in the network to balance the load of the proxy service peer.

SUMMARY OF THE INVENTION

The objective of the present invention is to overcome the defect of the prior art of peer interworking between P2P overlay networks, namely, overload of the P2P proxy service peer.

To achieve the foregoing objective, a P2P network is provided in an embodiment of the present invention and includes:

more than one local overlay network, which includes more than one proxy service peer; and a global overlay network, composed of proxy service peers of all local overlay networks.

The proxy service peer is adapted to respond to a request of the requesting peer, query the local overlay network or global overlay network, and return the address information of the requested peer or the selected requested proxy service peer to the requesting peer.

To achieve the foregoing objective, a proxy service peer is provided in an embodiment of the present invention and includes:

a request responding module, adapted to receive a query request from the requesting peer in the P2P network system, and send the query request to the proxy selecting module;

the proxy selecting module, adapted to determine the address information of the requested peer according to the query request or select a requested proxy service peer; and an information sending module, adapted to return the address information of the requested peer or the selected requested proxy service peer to the requesting peer.

To achieve the foregoing objective, a method of peer interworking between P2P overlay networks is provided in an embodiment of the present invention and includes the following steps:

obtaining, by a requesting peer, a proxy service peer list in the local overlay network;

by the requesting peer, selecting a proxy service peer in the proxy service peer list, and sending a query request to the proxy service peer;

sending, by the requesting peer after receiving a query response, a call request message to the requested proxy service peer selected by the requesting proxy service peer; and setting up, by the requesting peer, communication according to the address information of the requested peer returned by the requested proxy service peer.

Therefore, the embodiments of the present invention provide the following benefits:

According to the embodiments of the present invention, multiple P2P proxy service peers are set in the local overlay network, thus the load of the proxy service peer is relieved, the response speed of the proxy service peer is increased, and the efficiency of utilizing the P2P service peer resources is improved.

The technical solution of the present invention is hereinafter described in detail with reference to accompanying drawings and preferred embodiments.

DETAILED DESCRIPTION OF THE EMBODIMENTS

Figure 1A:
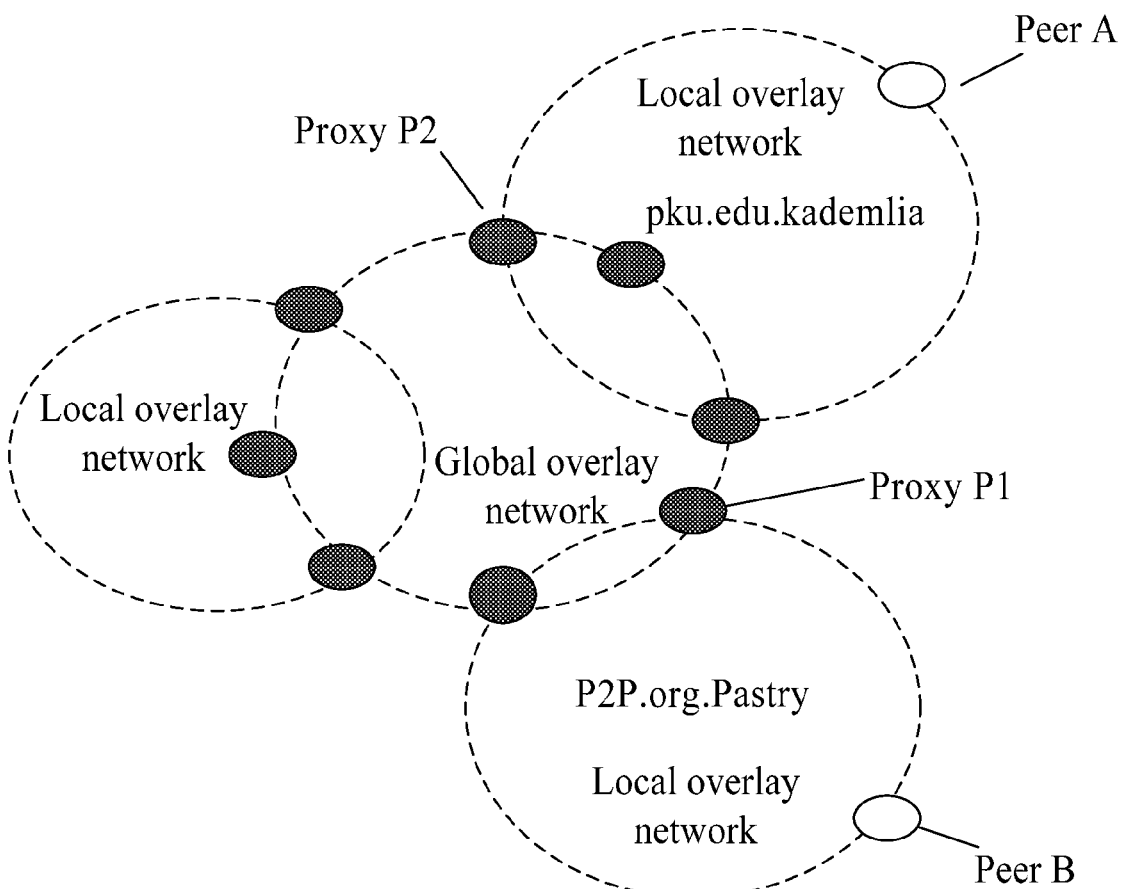
FIG. 1A shows a structure of a network system in an embodiment of the present invention.
Figure 1B:
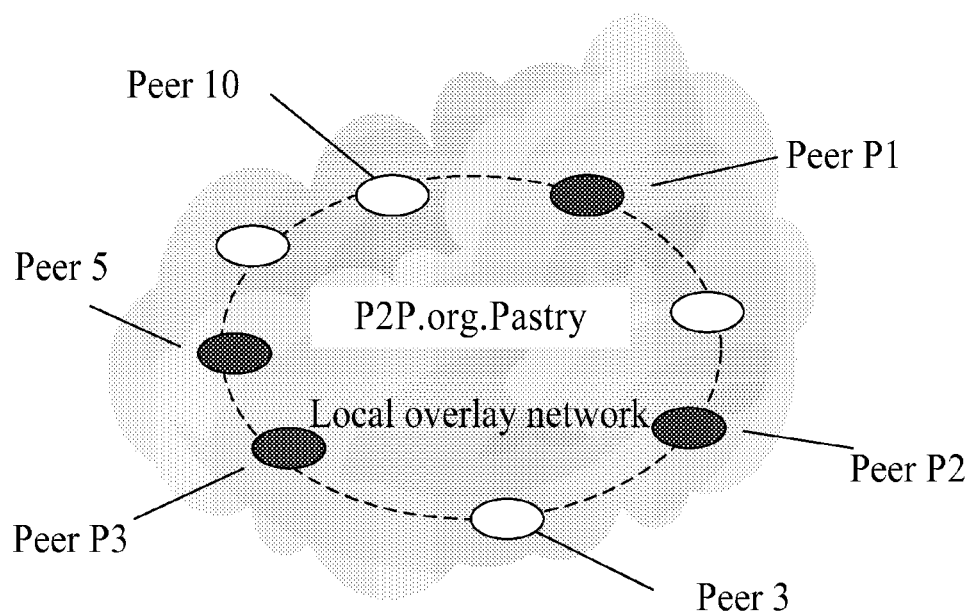
FIG. 1B shows a structure of a local overlay network in an embodiment of the present invention.

As shown in FIG. 1A, a network system in an embodiment of the present invention includes multiple local overlay networks. As shown in FIG. 1B, each local overlay network includes more than one P2P proxy service peer. In FIG. 1A and FIG. 1B, the proxy service peers are illustrated in black. In FIG. 1B, the non-proxy service peers are illustrated in white. As shown in FIG. 1A, the network system also includes a global overlay network composed of proxy service peers of all local overlay networks. The proxy service peers are adapted to respond to the request of the requesting peer, query the local overlay network or global overlay network, and return the address information of the requested peer or the selected requested proxy service peer to the requesting peer.

The local overlay network in this embodiment includes multiple proxy service peers which share the load of a proxy service peer in the prior art. Therefore, this embodiment overcomes the defect of overload of the P2P proxy service peer in the prior art of peer interworking between P2P overlay networks.

Moreover, the proxy service peer in this embodiment includes the following modules in addition to the functional modules available from the prior art:

a load information calculating module, adapted to count the current transactions, and calculate the load information; and a load information releasing module, adapted to release the load information to the local overlay network and global overlay network where the proxy service peer resides.

In this embodiment, the load information is represented by a load factor. The formula for calculating the load factor is:

load factor=quantity of current transactions/maximum quantity of processible transactions.

Therefore, the requesting peer may select the proxy service peer with a lighter load for providing services according to the load information, thus balancing the load between the proxy service peers in the network system. Accordingly, each peer in the network system includes:

a service selecting module, adapted to select the proxy service peer with the lightest load for providing services according to the load information in the P2P network system.

In this embodiment, multiple P2P proxy service peers are set in the local overlay network, thus relieving the load of the proxy service peer, increasing the response speed of the proxy service peer, and improving the efficiency of utilizing the P2P service peer resources. Moreover, the proxy service peer may calculate the load factor through a load information calculating module, and release the load factor to the local overlay network and global overlay network through a load information releasing module. Therefore, when selecting a proxy service peer for providing proxy services, the proxy service peer with a lighter load may be selected for providing proxy services by referring to the load information, thus further balancing the load between the proxy service peers.

The proxy service peer in this embodiment includes a request responding module, a proxy selecting module, and an information sending module, wherein: the request responding module is adapted to receive the query request from the requesting peer in the P2P network system, and send the query request to the proxy selecting module; the proxy selecting module is adapted to determine the address information of the requested peer according to the query request, or select a requested proxy service peer; and the information sending module is adapted to return the address information of the requested peer or the selected requested proxy service peer to the requesting peer.

In this embodiment, a proxy selecting module for selecting the requested proxy service peer is added in proxy service peer. Therefore, for a proxy service peer in a P2P network, the requested proxy service peer may be selected to provide services for the requesting peer. Compared with the prior art where a fixed proxy service peer is requested to provide proxy services, in this embodiment the load of the proxy service peer is relieved effectively.

In this embodiment, the proxy service peer further includes:

a load information calculating module, adapted to count the current transactions, and calculate the load information; and a load information releasing module, adapted to release the load information to the local overlay network where the proxy service peer resides and global overlay network.

Accordingly, the proxy service peer in this embodiment further includes:

a service selecting module, adapted to select the proxy service peer with the lightest load for providing services according to the load information in the P2P network system.

Therefore, when the proxy service peer selects the requested proxy service peer for providing proxy services, the requested proxy service peer with a lighter load may be selected with reference to the load information, thus further balancing the load between the requested proxy service peers.

Figure 2:
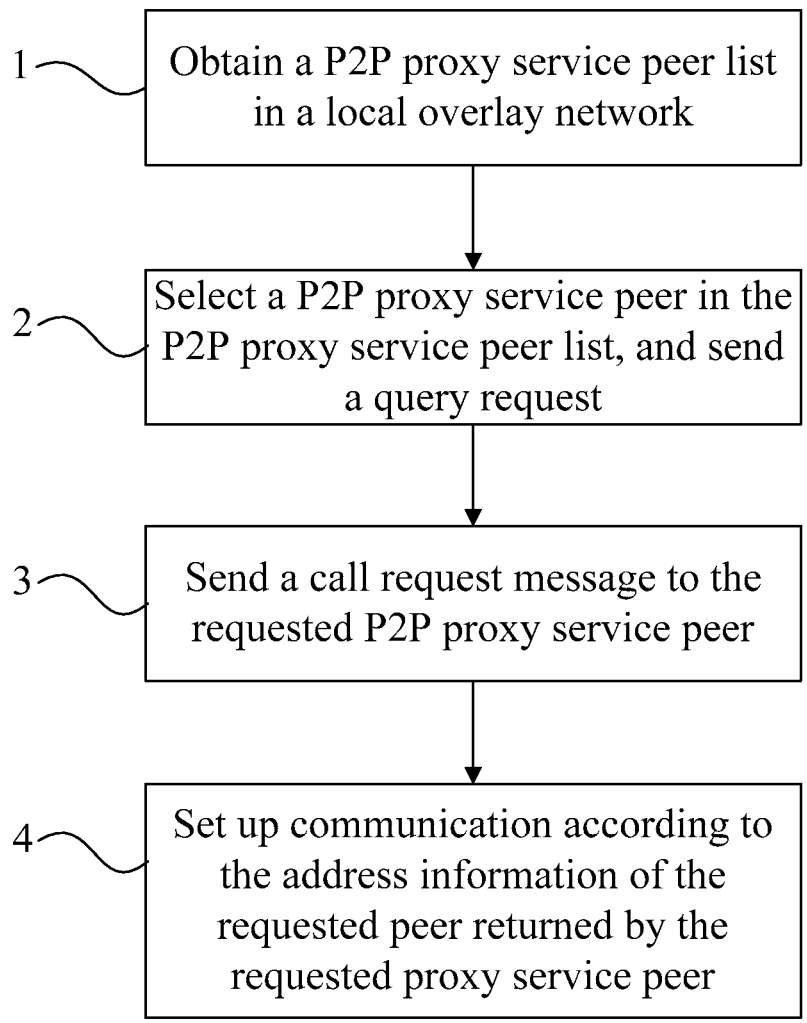
FIG. 2 is a flowchart of a method of peer interworking between P2P overlay networks in an embodiment of the present invention.

As shown in FIG. 2, the method of peer interworking between P2P overlay networks in an embodiment of the present invention includes the following steps:

Step 1: The requesting peer obtains a proxy service peer list in the local overlay network;

Step 2: The requesting peer selects a proxy service peer in the proxy service peer list, and sends a query request to this proxy service peer;

Step 3: After receiving a query response, the requesting peer sends a call request message to the requested proxy service peer selected by the requesting proxy service peer; and Step 4: The requesting peer sets up communication according to the address information of the requested peer returned by the requested proxy service peer.

In this embodiment, the proxy service peer list in the local overlay network provides address information (which may be IP address information) of all proxy service peers, and the requesting peer may send a query request such as a Distributed Hash Table (DHT) query request to obtain the address information of each proxy service peer in the list. Among the proxy service peers in the local overlay network, the requesting peer selects one peer as a requesting proxy service peer to provide proxy services. In the global overlay network, the requesting proxy service peer queries for the proxy service peer list of the local overlay network where the requested peer resides, and selects one proxy service peer as a requested proxy service peer, and returns the address information of the requested proxy service peer to the requesting peer. The requesting peer contacts the requested proxy service peer to obtain the address information of the requested peer. Subsequently, the requesting peer sets up communication with the requested peer according to the normal session setup process to implement resource sharing or network services, for example, NAT traversal service, media relay service, and streaming media service.

The foregoing method is applicable to peers between different local overlay networks. For the peers located in the same overlay network, the requesting peer may send a DHT query request directly to obtain the address information of the requested peer and set up a connection without use of any proxy service peer, thus eliminating the unnecessary load of the proxy service peer.

Therefore, in this embodiment, the operations before step 1 include: the requesting peer judges whether the requested peer is in the same local overlay network according to the requested peer identifier; if the requested peer is in the same local overlay network, the requesting peer sends a session request to the requested peer directly; otherwise, the requesting peer performs step 1.

In this embodiment, a DHT algorithm is used as a structured P2P routing algorithm to construct a lower-layer P2P overlay network. All proxy service peers included in a local overlay network are registered by using the same public identifier name. In this embodiment, the proxy service peers are registered by using the same public Uniform Resource Identifier (URI) name. For example, as shown in FIG. 1B, all proxy service peers in the local overlay network "P2P.org.Pastry" are registered by using the public URI name "proxy:P2P.org.Pastry" (in the embodiment shown in FIG. 1B, the time of registration and update of one proxy service peer is independent of that of another). When a client peer needs to search for the proxy service peer, this public URI name may be used as a key to search the DHT for the information (such as location and load) about the registered proxy service peer.

For ease of understanding, the process of registration and update of the P2P service peer in this embodiment is described briefly in this way: peers P1, P2 and P3 in the local overlay network "P2P.org.Pastry" are consecutively registered and declared as proxy service peers of the overlay network. The key-value pair indicative of the location information (URI, IP) of each peer is stored into the DHT system, and updated periodically. The requesting peer queries the DHT by using the URI as a key to obtain the address information of the three proxy service peers, and selects one of them as a proxy service peer.

Therefore, step 1 may include the following:

the requesting peer sends a DHT query request by using the Hash value of the public identifier name of the proxy service peer in the local overlay network as a query parameter; and the requesting peer obtains a proxy service peer list of the local overlay network according to the received response.

To further balance the load between all proxy service peers, the requesting peer should select the proxy service peer with the lightest load for providing proxy services.

Step 2 includes: the requesting peer selects a proxy service peer with the lightest load in the proxy service peer list, and sends a query request to this proxy service peer.

Likewise, when selecting a requested proxy service peer for the requesting peer, the requesting proxy service peer should select the proxy service peer with the lightest load in the P2P proxy service peer list in the local overlay network where the requested peer resides for providing proxy services. Therefore, operations included between step 2 and step 3 are as follows:

After receiving the query request from the requesting peer, according to the query request, the requesting proxy service peer searches for the P2P proxy service peer list in the local overlay network where the requested peer resides;

the requesting proxy service peer selects a proxy service peer with the lightest load in this list as a requested proxy service peer; and the requesting proxy service peer returns the address information of the requested proxy service peer to the requesting peer that sends the query request.

In this embodiment, the DHT algorithm is used to construct a lower-layer P2P overlay network. Therefore, operations included between step 3 and step 4 are as follows:

After receiving the call request message from the requesting peer, the requested proxy service peer starts DHT query in the local overlay network where the requested proxy service peer resides, and returns the found address information of the requested peer to the requesting peer.

This embodiment is described below, taking the call session setup process of a P2P overlay network peer as an example. As shown in FIG. 1A, supposing peer B (sip:Bob@P2P.org.Pastry) in the local overlay network "P2P.org.Pastry" intends to send a call request to peer A (sip:Alice@pku.edu.kademlia) in another local overlay network "pku.edu.kademlia", before sending the formal call request, peer B must obtain the contact address information of peer A first. This information is obtained through a SIP REGISTER message. When the proxy service peer works in the redirection mode, the basic message interaction process includes:

First, according to the URI of the requested peer A, the requesting peer B confirms that it is not in the same P2P overlay network where peer A resides. The User Agent (UA) of peer B sends a DHT query request through the peer B bound to the UA, querying for the proxy service peer list in the local overlay network "P2P.org.Pastry" (a series of SIP messages are included, and the query keyword is a Hash value with the input of "proxy: P2P.org.Pastry"). The query result is returned through a SIP 200 response message. The "contact" field in the response message includes a list of all peers that have registered to provide proxy services in the overlay network. According to the returned query result, the proxy service peer with the lightest load is selected, for example, proxy P1 in FIG. 1A.

The subsequent process is as follows:

Peer B sends a REGISTER query request to proxy P1. Through the "request-URI (sip:Alice@pku.edu.kademlia)" in the SIP message, proxy P1 determines that peer A is a user of the overlay network "pku.edu.kademlia". Proxy P1 queries for the list of P2P proxy service peers registered by the destination overlay network in the global overlay network. After obtaining the list, proxy P1 selects the proxy service peer with the lightest load value in the overlay network "pku.edu.kademlia", for example, the proxy service peer P2 in FIG. 1A, and returns the address information of proxy P2 to peer B through a SIP 302 redirection message.

Subsequently, Peer B sends a REGISTER request message to proxy P2. After receiving the message, proxy P2 starts DHT query in the local overlay network "pku.edu.kademlia" to obtain the address information of user A, and returns the address information to B through a SIP 200 message.

Finally, peer B sets up communication with peer A directly according to the normal SIP INVITE session process.

It is evident that in the foregoing method of peer interworking between P2P overlay networks, in order to balance the load between the proxy service peers, selecting a proxy service peer for a call may be based on the load state of each proxy service peer. Blindness in selecting the proxy service peer is avoided. The response speed of the proxy service peer increases. The efficiency of utilizing the P2P service peers and other resources is improved.

Obviously, to implement the foregoing functions, each P2P proxy service peer needs to release load information regularly or irregularly so that other peers in the overlay network can be aware of its resource load state, which serves as a basis for the requesting peer to select a proxy service peer in the future.

The proxy service peer may release load information in the following way:

In this embodiment, the SIP transaction quantity of the proxy service peer is used to reflect the load state. Once receiving a new request message, the proxy service peer generates a User Agent Server (UAS) transaction for it, and invokes the DHT query routine. The specific DHT query may be implemented by a corresponding SIP User Agent Client (UAC) transaction. Finally, the DHT query result is returned through the UAC transaction. Although the SIP transaction quantity is not exactly equal to the load, it well reflects the load state of the peer and is easily available.

This embodiment uses the load factor to measure the load state of the proxy service peer. Higher values of the load factor of a proxy service peer indicate heavier loads of the proxy service peer. The proxy service peer calculates its load factor periodically and releases it into the network. Therefore, the releasing of the load information of the proxy service peer includes the following steps:

counting the current transactions;

calculating the load factor according to this formula: load factor=quantity of current transactions/maximum quantity of processible transactions; and releasing the load factor to the overlay network where the proxy service peer resides.

The quantity of current transactions (Current-Transactions) is the quantity of transactions that exist at the reporting time of the proxy service peer, and may be obtained through the Application Programming Interface (API) provided by the SIP protocol stack. The maximum quantity of processible transactions (Load-High) is the maximum quantity of transactions processible by the proxy service peer. Considering the heterogeneousness and difference of the peers in the overlay network, the value of Load-High varies between different proxy service peers. The Load-High of the proxy service peer may be calculated with reference to multiple resources of the peer, for example, CPU processing capability, or network bandwidth. That is, the Load-High is a output value of a function whose input includes CPU processing capability, network bandwidth and other parameters.

In this embodiment, the DHT algorithm is used to construct a lower-layer P2P overlay network. Therefore, the proxy service peer needs to be registered and updated periodically. To improve the network efficiency in this embodiment, the proxy service peer releases its load information at the same time of registration and update. The load information may be carried by a new contact parameter such as Load-factor, and is reported through registration and periodical update of the proxy service peer. It is worthy of emphasis that: even if no load information is released, the registration and update process is necessary, and the load release may be regarded as an incidental process. Compared with the prior art, this embodiment does not bring extra network communication pressure.

The process of the proxy service peer releasing its load information at the same time of registering and updating the proxy service peer list in this embodiment includes:

the proxy service peer locates the peer that stores the proxy registration list through the P2P routing algorithm, and sends the REGISTER request and load factor to the peer that stores the proxy registration list;

the peer that stores the proxy registration list judges whether itself is responsible for storing the information corresponding to the Hash key of the proxy service peer; if yes, the peer stores such information; otherwise, the peer searches the routing table for information about the peer responsible for storing, and returns the information to the proxy service peer;

according to the information about the peer responsible for storing, the proxy service peer sends a REGISTER request and a load factor to the peer responsible for storing; and the peer responsible for storing accepts the REGISTER request, and stores the Hash key of the proxy service peer and the load factor.

Through the foregoing steps in this embodiment, the proxy service peer releases its load information at the same time of registration and update.

The proxy service peer needs to synchronize the registration, update and load information between the local overlay network and the global overlay network. The registration, update, and release of load information in the local overlay network are similar to those in the global overlay network except the different overlay network parameter (the overlay network parameter is used to describe the identifier of the overlay network) and/or DHT parameter (the DHT parameter is used to describe the P2P algorithm used by the overlay network).

Besides, the Hash key of the proxy service peer may be calculated in this way:

using the public identifier name of the proxy service peer in the local overlay network where the proxy service peer resides as the identifier name of the proxy service peer; and performing Hash calculation for the identifier name of the proxy service peer, and using the calculation result as the Hash key of the proxy service peer.

For example, in FIG. 1B, if peer 5 is a proxy service peer in the local overlay network "P2P.org.Pastry", or this peer is triggered for its own reasons or system reasons and expects to become a proxy service peer, the peer stores the key-value pair (proxy:P2P.org.Pastry, sip:5@10.0.0.5) into the DHT system, where "proxy:P2P.org.Pastry" is the public URI name of the proxy service peer in the overlay network "P2P.org.Pastry", and "sip:5@10.0.0.5" is the address information of peer 5. While performing registration and update, the proxy service peer (sip:5@10.0.0.5) stores the load factor as the information corresponding to the Hash key (proxy: P2P.org.Pastry, sip:5@10.0.0.5) into the DHT system.

At the beginning, peer 5 does not know onto which exact peer the key-value pair should be stored, and needs to locate the specific peer responsible for storing (namely, the peer which stores the key-value data actually) according to the P2P routing algorithm (Pastry). That is, in this embodiment, peer 5 sends a REGISTER request to peer 10 in the overlay network "P2P.org.Pastry" according to the routing table defined in the P2P algorithm. According to the Hash (proxy: P2P.org.Pastry) value, peer 10 determines that it is not responsible for storing the information corresponding to the Hash key. Therefore, peer 10 queries its own routing table and finds that the peer closest to the Hash (proxy:P2P.org.Pastry) value in the Hash space is another peer, peer 3. Peer 10 returns a redirection message to peer 5, telling that the request should be sent to peer 3. The registration and update request finally arrives at peer 3 responsible for storing. The detailed message is as follows:

```
"REGISTER" message from peer 5 to peer 10:
    "REGISTER sip:10.0.0.10 SIP/2.0
    To: proxy:P2P.org.Pastry;resourceID=11
    From: proxy:P2P.org.Pastry;resourceID=11
    Contact: <sip:5@10.0.0.5>;load-facor=0.4
    Expires: 120
    DHT-PeerID:<sip:5@10.0.0.5;user=peer>;algorithm=sha1;
        dht=PastryIter1.0;overlay=P2P.org.Pastry;expires=1200
    Require: dht
    Supported: dht"
"SIP 302" message from peer 10 to peer 5:
    "SIP/2.0 302 Moved Temporarily
    To: proxy:P2P.org.Pastry;resourceID=11
    From: proxy:P2P.org.Pastry;resourceID=11
    Contact: <sip:3@10.0.0.3;user=peer>
    DHT-PeerID:<sip:10@10.0.0.10;user=peer>; algorithm=sha1;
        dht=PastryIter1.0; overlay=P2P.org.Pastry; expires=800
    DHT-Link: <sip:5@10.0.0.5;user=peer>;link=P1;expires=1200
    DHT-Link: <sip:3@10.0.0.3;user=peer>;link=S1;expires=412
    Require: dht
    Supported: dht"
"ACK" message from peer 5 to peer 10:
    "ACK sip:10.0.0.10 SIP/2.0
    To: proxy:P2P.org.Pastry;resourceID=11
    From: proxy:P2P.org.Pastry;resourceID=11
    DHT-PeerID:<sip:10@10.0.0.10;user=peer>;algorithm=sha1;
        dht=PastryIter1.0;overlay=P2P.org.Pastry;expires=1200
    DHT-Link: <sip:5@10.0.0.5;user=peer>;link=P1;expires=1200
    DHT-Link: <sip:3@10.0.0.3;user=peer>;link=S1;expires=412
    Require: dht
    Supported: dht"
"REGISTER" message from peer 5 to peer 3:
    "REGISTER sip:10.0.0.3 SIP/2.0
    To: proxy:P2P.org.Pastry;resourceID=11
    From: proxy:P2P.org.Pastry;resourceID=11
    Contact: <sip:5@10.0.0.5>;load-facor=0.4
    Expires: 120
    DHT-PeerID:<sip:5@10.0.0.5;user=peer>;algorithm=sha1;
        dht=PastryIter1.0;overlay=P2P.org.Pastry;expires=1200
    Require: dht
    Supported: dht"
"SIP 200 OK" message from peer 3 to peer 5:
    "SIP/2.0 200 OK
    To: proxy:P2P.org.Pastry;resourceID=11
    From: proxy:P2P.org.Pastry;resourceID=11
    Contact: <sip:5@10.0.0.5>;load-facor=0.4
    Expires: 120
    DHT-PeerID:<sip:3@10.0.0.3;user=peer>;algorithm=sha1;
        dht=PastryIter1.0;overlay=P2P.org.Pastry;expires=600
```

-continued

```
    DHT-Link:<sip:10@10.0.0.10;user=peer>;link=P1;expires=405
    DHT-Link:<sip:5@10.0.0.5;user=peer>;link=S1;expires=1200
    DHT-Link:<sip:10@10.0.0.10;user=peer>;link=S2;expires=405
    Require: dht
    Supported: dht"
```

When a proxy service is required, the requesting peer obtains a proxy service peer list in the specified overlay network through DHT query. The basic process is similar to the process of registration and update of peer 5 except that the initial "REGISTER" message does not contain "contact" field. In the final response message, peer 3 returns all proxy service peers corresponding to the public service URI (which is "proxy: P2P.org.Pastry" in this example) through a "contact" field. For example, the final response message of a DHT proxy query request in the overlay network "P2P.org.Pastry" is as follows:

```
"SIP/2.0 200 OK
    To: <proxy:P2P.org.Pastry;resourceID=11>
    From: <sip:3@10.0.0.3;user=peer>
    Contact: <sip:5@10.0.0.5>;expires=100;load-facor=0.4
    Contact: <sip:123@10.0.0.123>;expires=60;load-facor=1
    Contact: <sip:76@10.0.0.76>;expires=110;load-facor=0.6
    DHT-PeerID: <sip:14@10.0.0.14;user=peer>;algorithm=sha1;
        dht=PastryIter1.0;verlay=P2P.org.Pastry;expires=600
    Require: dht
    Supported: dht"
```

The "contact" field includes the details of each proxy service peer, including address information, time information and load information. The "expires" parameter indicates the remaining time before expiry of the registration information, and the "load-facor" parameter indicates the load information reported by each proxy service peer at the time of the previous registration and update. The requesting peer (or proxy service peer) selects the proxy service peer with the lightest load, namely, the proxy service peer "<sip:5@10.0.0.5>; expries=100; load-facor=0.4" in this embodiment, as the next-hop peer on the route of the message.

Figure 3:
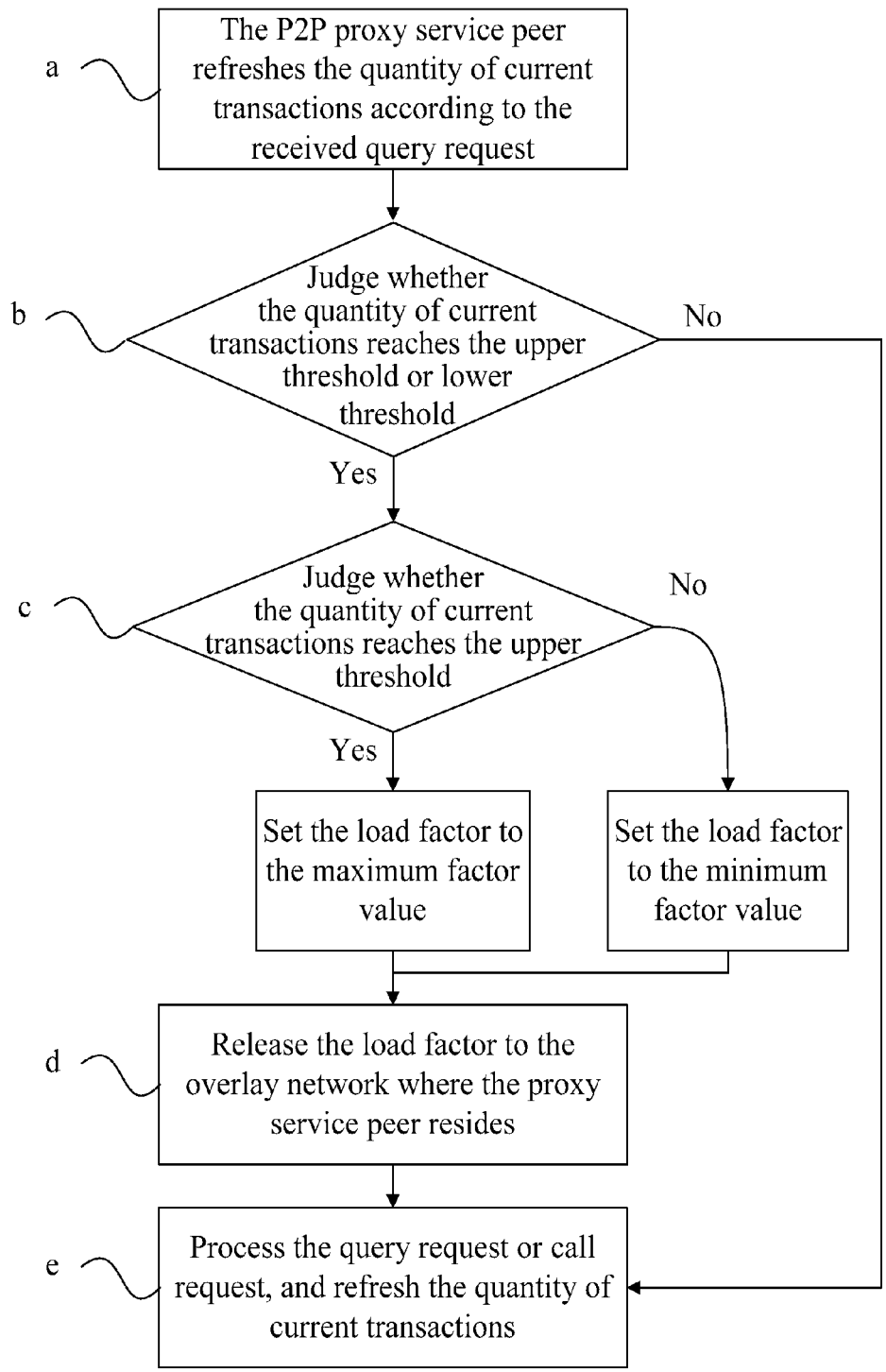
FIG. 3 is a load information optimization flowchart in the method of peer interworking between P2P overlay networks in an embodiment of the present invention.

This embodiment releases the load information by using the feature of periodical registration and update of the proxy service peer. It is evident that the load information obtained by the requesting peer through query is not real-time, and cannot reflect the actual load state at the call request time completely. Specific to this problem, as shown in FIG. 3, the method for releasing the load information of the proxy service peer in this embodiment may include the following steps additionally for the purpose of optimization:

Step a: The proxy service peer updates the quantity of current transactions according to the received query request;

Step b: The proxy service peer judges whether the quantity of current transactions reaches the upper threshold or lower threshold; if yes, the proxy service peer proceeds to step c, otherwise, to step e;

Step c: The proxy service peer judges whether the quantity of current transactions reaches the upper threshold; if yes, the load factor is set to the maximum factor value; otherwise, the load factor is set to the minimum factor value;

Step d: The load factor is released to the overlay network where the proxy service peer resides; and Step e: The query request or call request is processed, and the quantity of current transactions is updated.

In this embodiment, the upper threshold value may substitute for the maximum quantity of transactions processible by the proxy service peer (Load-High). Similarly, a lower threshold (Load-Low) is defined. "Load-Low" is also represented by the quantity of transactions of the proxy service peer, and serves as a reference. "Load-Low" may be a percentage of "Load-High", for example, "Load-Low=Load-High*40%" in this embodiment.

That is, before processing the assigned new requests, the proxy service peer checks the actual quantity of current transactions first. If the actual quantity of current transactions exceeds "Load-High", the load factor is set to the maximum factor value. For example, in this embodiment, the value range of the load factor is (0, 1], namely, the maximum factor value is 1. If the actual quantity of current transactions is less than "Load-Low", the load factor is set to the minimum factor value, for example, 0.4 in this embodiment, a new register and update request and load information are sent immediately, and then the request is processed.

In the method of peer interworking between P2P overlay networks in an embodiment of the present invention, multiple P2P proxy service peers are set in the local overlay network, and one peer is selected for providing proxy services. Compared with the prior art which requests a single proxy service peer to provide proxy services, the embodiment of the present invention relieves the load of each proxy service peer, increases the response speed of the proxy service peer, and improves the efficiency of utilizing the P2P service peer resources. Moreover, in this embodiment, the load factor of the proxy service peer is calculated and released. Therefore, at the time of selecting a proxy service peer for providing proxy services, the proxy service peer with a lighter load may be selected with reference to the load factor, thus further balancing the load between all proxy service peers. In addition, a method for optimizing the load factor is provided in an embodiment of the present invention to make the load factor reflect the load information of the proxy service peer in real time.

The embodiments described above are only preferred embodiments, which are not intended to limit the scope of protection of the present invention. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A Peer-to-Peer (P2P) network system, comprising multiple local overlay networks and a global overlay network composed of proxy service peers of all the local overlay networks, wherein:

at least a local overlay network comprises more than one proxy service peer;

the proxy service peer is adapted to receive a query request of a requesting peer, query the global overlay network for a proxy service peer list of the local overlay network where the requested peer resides, and return address information of a selected requested proxy service peer to the requesting peer;

the proxy service peer is further adapted to count current transactions, calculate load information, and release the load information to the global overlay network or the local overlay network where the proxy service peer resides;

the proxy service peer is further adapted to be registered and updated periodically;

the proxy service peer is further adapted to release its load information at time of registration and update;

wherein the requesting peer in the local overlay network is adapted to obtain a proxy service peer list in a local overlay network, and select a proxy service peer with a lightest load in the proxy service peer list for providing proxy services according to the load information.

2. A proxy service peer terminal that executes operations of a proxy service peer, comprising:

a hardware processor to execute a request responding module, a proxy selecting module, and an information sending module, wherein:

the request responding module to receive a query request from a requesting peer, and send the query request to the proxy selecting module;

the proxy selecting module to determine address information of a requested peer according to the query request, or select a requested proxy service peer;

the information sending module to return address information of the requested peer or the selected requested proxy service peer to the requesting peer;

a load information calculating module to count current transactions and calculate load information; and a load information releasing module to release the load information at time of periodic registration and update of the proxy service peer to a global overlay network or a local overlay network where the proxy service peer resides, the proxy service peer is selectable by the requesting peer based upon a lightest load for providing proxy services according to the released load information of the proxy service peer.

3. A method of peer interworking between Peer-to-Peer (P2P) overlay networks, comprising:

releasing, by a proxy service peer, load information of the proxy service peer at time of periodic registration and update of the proxy service peer;

obtaining, by a requesting peer, a proxy service peer list in a local overlay network, and selecting a proxy service peer with a lightest load in the proxy service peer list as the requesting proxy service peer;

sending, by the requesting peer, a query request to the requesting proxy service peer, and receiving a query response containing a requested proxy service peer which is selected by the requesting proxy service peer;

sending, by the requesting peer, a call request message to the requested proxy service peer; and receiving address information of a requested peer returned by the requested proxy service peer; and setting up, by the requesting peer, communication with the requested peer according to the address information of the requested peer.

4. The method of claim 3, wherein before the obtaining the proxy service peer list in the local overlay network, the method further comprises:

judging, by the requesting peer, whether the requested peer is in the same local overlay network according to a requested peer identifier; if the requested peer is in the same local overlay network, sending a session request to the requested peer directly.

5. The method of claim 3, wherein the process of the requesting peer obtaining the proxy service peer list in the local overlay network comprises:

sending, by the requesting peer, a Distributed Hash Table (DHT) query request by using a Hash value of a public identifier name of the proxy service peer in the local overlay network as a query parameter; and obtaining, by the requesting peer, the proxy service peer list in the local overlay network according to a received response.

6. The method of claim 3, wherein after the requesting peer sends the query request to the requesting proxy service peer, the method further comprises:
   receiving, by the requesting proxy service peer, the query request from the requesting peer;
   searching, by the requesting proxy service peer, for a proxy service peer list in the local overlay network where the requested peer resides according to the query request, and selecting a proxy service peer with a lightest load in the proxy service peer list as the requested proxy service peer; and
   returning, by the requesting proxy service peer, address information of the requested proxy service peer to the requesting peer.

7. The method of claim 3, wherein after the requesting peer sends the call request message to the requested proxy service peer, the method further comprises:
   receiving, by the requested proxy service peer, the call request message from the requesting peer;
   starting, by the requested proxy service peer, Distributed Hash Table (DHT) query in the local overlay network where the requested proxy service peer resides, and returning the found address information of the requested peer to the requesting peer.

8. The method of claim 3, further comprising:
   counting, by the proxy service peer, current transactions, and calculating load information; and
   releasing, by the proxy service peer, the load information to the overlay network where the proxy service peer resides.

9. The method of claim 3, wherein the process of the proxy service peer releasing its load information at the time of registration and update comprises:
   locating, by the proxy service peer, a peer that stores a proxy registration list through a P2P routing algorithm, and sending a REGISTER request and the load information to the peer that stores the proxy registration list;
   judging, by the peer that stores the proxy registration list, whether the peer is responsible for storing information corresponding to a Hash key of the proxy service peer; if yes, storing the Hash key of the proxy service peer and the load information; otherwise, searching a routing table for information about the peer responsible for storing, and sending the information to the proxy service peer;
   sending, by the proxy service peer, the REGISTER request and the load information to the peer responsible for storing according to the information about the peer responsible for storing; and
   accepting, by the peer responsible for storing, the REGISTER request, and storing the Hash key of the proxy service peer and the load information.

10. The method of claim 9, wherein the Hash key of the proxy service peer is calculated in this way:
    using a public identifier name of the proxy service peer in the local overlay network where the proxy service peer resides as an identifier name of the proxy service peer; and
    performing Hash calculation for the identifier name of the proxy service peer, and using results of the calculation as the Hash key of the proxy service peer.

* * * * *